Patented Sept. 13, 1932

1,876,928

UNITED STATES PATENT OFFICE

RICHARD HERZ, OF FRANKFORT-ON-THE-MAIN, AND MAX SCHUBERT, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR MANUFACTURING ARYL-ORTHO-CARBOXYAMIDO-MERCAPTANS

No Drawing. Application filed January 29, 1929, Serial No. 336,005, and in Germany January 31, 1928.

We have found that ortho-cyanogen-aryl-sulfocyanogen compounds of the general formula:

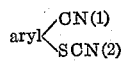

which are described in U. S. Patent No. 1,766,820, can be saponified by acidic agents in such a manner that the nitrile group is converted into the carboxy-amido-group without forming a carboxylic acid group and that simultaneously the sulfocyanogen group is affected. In some cases the saponification of the sulfocyanogen-group stops before the end product is formed and is to be completed by further treating the primary products with an alkali, advantageously in the presence of a suitable reducing agent. In all cases the aryl-carboxyamido-ortho-mercaptans of the formula:

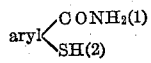

are obtained in a smooth reaction. They are capable of being condensed with mono-chloro-acetic acid in an alkaline solution to form the corresponding aryl-carboxyamido-ortho-thioglycollic acids.

The ortho-cyanogen-aryl-sulfocyanogen compounds are advantageously at first dissolved or suspended for instance in sulfuric acid of about 90% strength, the mixture is allowed to stand in the cold for some hours and the reaction products are isolated by pouring the mixture into water. For the further treatment on a technical scale the aryl-carboxy-amido-ortho-mercaptans need not be isolated, but the mercapto products may be directly, after having been treated with an alkali, condensed in the customary manner in the alkaline solution with mono-chloro-acetic acid.

The aryl-ortho-carboxy-amido-mercaptans are important intermediates for manufacturing thioindigo dyestuffs.

In order to further illustrate our invention, the following examples are given, the parts being by weight and all temperatures in centigrade degrees. We wish it however to be understood that we are not limited to the particular products nor reaction conditions mentioned therein.

Example 1

A solution of 10 parts of 1-methyl-2-cyanogen-3-sulfocyanogen-5-chloro-benzene in 100 parts of sulfuric acid of 90% strength is stirred at room temperature (20–25°) for some hours. Then the mass is poured into 1000–2000 parts of cold water and the reaction product separated in the form of yellow flakes is filtered off. It represents when recrystallized from spirit colorless needles melting at 182–183°. According to the analysis it corresponds probably to the formula:

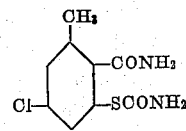

10 parts of the said compound are digested with about 350 parts of a caustic soda solution of 4% strength with the addition of 1 part of sodium hydrosulfite or the equivalent amount of zinc dust. When after a short time the mass has become dissolved, the mercapto compound formed is condensed without isolation advantageously at room temperature with an alkaline solution of 15 parts of mono-chloro-acetic acid in 100 parts of water. As soon as the mercaptan reaction has disappeared, the mass is acidulated. Thereby the 1-methyl-5-chloro-benzene-2-carboxy-amido-3-thioglycollic acid is formed.

Example 2

A solution of 8 parts of 1-cyanogen-2-sulfocyanogen-4-chloro-benzene in 100 parts of sulfuric acid of 90% strength is stirred at room temperature (20–25°) for about 20 hours. Thereby a pulp of fine needles is formed which is filtered and freed from acid by washing. When dry the reaction product thus obtained melts at about 305°. According to the analysis and its chemical behaviour it corresponds probably to the formula:

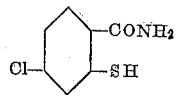

In order to prepare the corresponding thioglycollic acid the mercapto compound is condensed with monochloro acetic acid.

In an analogous manner 1-cyanogen-2-sulfocyanogen-4-ethoxy-benzene yields 4-ethoxy-benzene-1-carboxy-amido-2-mercaptan melting at about 285°.

We claim:

1. A process for manufacturing aryl-ortho-carboxyamido-mercaptans which comprises treating an ortho-cyanogen-aryl-sulfocyanogen-compound of the general formula:

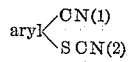

with an acidic hydrolyzing agent.

2. A process for manufacturing aryl-ortho-carboxyamido-mercaptans which comprises treating an ortho-cyanogen-aryl-sulfocyanogen-compound of the general formula:

first with an acidic hydrolyzing agent, thereafter with an alkaline saponifying agent.

3. A process for manufacturing aryl-ortho-carboxyamido-mercaptans which comprises treating an ortho-cyanogen-aryl-sulfocyanogen-compound of the general formula:

first with an acidic hydrolyzing agent, thereafter with an alkaline saponifying agent in the presence of a reducing agent.

4. A process for manufacturing aryl-ortho-carboxyamido-mercaptans which comprises treating 1-methyl-2-cyanogen-3-sulfocyanogen-5-chlorobenzene first with an acidic hydrolyzing agent, thereafter with an alkaline saponifying agent in the presence of a reducing agent.

In testimony whereof, we affix our signatures.

RICHARD HERZ.
MAX SCHUBERT.